Dec. 22, 1931.   P. D. BODWELL ET AL   1,837,608
COMBINED TALKING MACHINE AND ADVERTISING DEVICE
Original Filed Aug. 28, 1925   7 Sheets-Sheet 1

Inventors
Paul D. Bodwell
Henry W. Bellows
By
Attorney

Dec. 22, 1931.   P. D. BODWELL ET AL   1,837,608
COMBINED TALKING MACHINE AND ADVERTISING DEVICE
Original Filed Aug. 28, 1925   7 Sheets-Sheet 6

Inventors
Paul D. Bodwell
Henry W. Bellows

Attorney

Patented Dec. 22, 1931

1,837,608

UNITED STATES PATENT OFFICE

PAUL D. BODWELL AND HENRY W. BELLOWS, OF WAYNESBORO, PENNSYLVANIA, ASSIGNORS TO DECA-DISC PHONOGRAPH COMPANY, OF WAYNESBORO, PENNSYLVANIA, A CORPORATION OF PENNSYLVANIA

COMBINED TALKING MACHINE AND ADVERTISING DEVICE

Application filed August 28, 1925, Serial No. 53,190. Renewed February 3, 1928.

Our said invention relates to automatic phonographs and it is an object thereof to provide an improved mechanism of this character which shall be capable of playing a series of records in a predetermined order and capable also of repeating the series indefinitely in the same order if desired.

A further object of the invention is to combine with such a machine display or advertising devices preferably, but not necessarily, of the type known as changeable exhibitors. In the preferred form of our invention we have utilized with the talking machine which appeals to the ear two different devices of two different types for appealing to the eye. One such device consists of surfaces on which advertising matter of various kinds may be displayed and which may be combined with means for lighting up said surfaces or for otherwise calling particular attention to them as they come into view. The other device consists of a series of lights, preferably in the form of variously colored electric lamps with means for illuminating them successively in any desired order. Either or both of these devices may be operated in timed relation with the record operating devices.

Referring to the accompanying drawings which are made a part hereof and on which similar reference characters indicate similar parts, Figure 1 is a front perspective of our invention built into a cabinet of conventional form, Figure 2, a rear perspective, Figure 3, a section on a central plane extending from front to rear of the device, Figure 4, a perspective looking upward at the rear of the machine, Figure 5, a detail section on line 5—5 of Fig. 4, Figure 6, a fragment, on an enlarged scale, of parts shown in Figure 5, Figure 7, a perspective of the mechanism viewed from the left-hand side looking forward, with parts broken away to show the interior of the mechanism, Figure 8, a fragmentary perspective similar to Figure 7 but on a smaller scale, Figure 9, a detail of parts shown in Figures 7 and 10, Figure 10, a perspective looking forward and downward toward the record table, the top of the supporting frame for the device being broken away, Figure 11, a view similar to Figure 10 looking from the rear forward, Figure 12, a detail of a part shown in Figure 10, Figure 13, a detail of another part in said figure, Figures 14 to 19 details of means for supporting a stack of records, in different operative positions, Figure 20, a detail of certain elements of such supporting means, Figure 21, a diagrammatic view of the device including a wiring diagram.

Figure 22, a section on line 22—22 of Figure 3,

Figure 23, a section on line 23—23 of Figure 3,

Figure 24, a detail of a part shown in Figure 7, and

Figure 25, a detail of a washer shown in Fig. 10.

Figures 10, 11, 12, 13, 25:
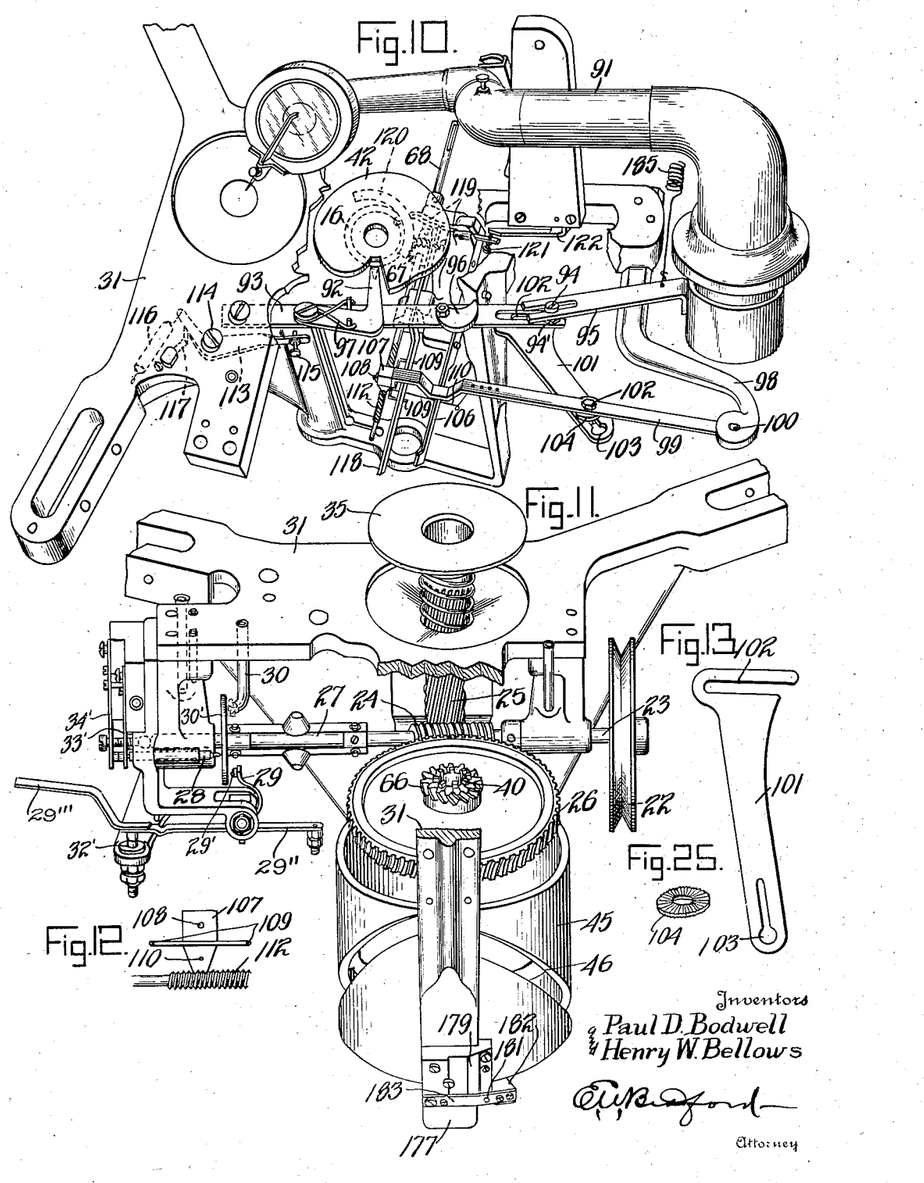

The device of our invention includes a motor 20 supplied with power from any convenient source and connected by a belt 21 to a pulley 22 on a shaft 23. The shaft 23 carries a worm 24 engaging at opposite sides with worm gears 25 and 26. The shaft 23 is provided at 27 with a centrifugal speed governor of conventional type provided with a circuit controller 29 in the form of a three-armed lever having a wooden point 29' (Fig. 11) on one arm for engagement with the governor disk 30'. Another arm 29'' is connected by a conductor 175 to a contact block 31' (Fig. 21) having a binding post to which is also connected another conductor 174 hereinafter described. The third arm 29''' of the lever has a contact for engaging a stationary contact 32'. At the other side of the disk 30' is a slidable circuit controller 28 adapted to engage the disk at one end and at the other end serving to cause engagement of a pair of contacts 33' and 34' on the contact block 31'. The purpose of the circuit controllers is to vary the amount of current transmitted to the phonograph motor in accordance with the requirements which will obviously be different on starting the machine than when running and which may vary for other reasons as when there are a number of records on the turntable. The resistance to be overcome is also much greater during the operation of changing records when the cam 45 and connected parts are required to be driven. In the present case full voltage is supplied when the circuit is closed through contacts 33' and 34' while a certain amount of resistance is thrown into the circuit at coil 166 when the circuit is closed at 32'.

An oiling device for the governor disk 30' is provided in the form of a tube 30 which extends downward through the frame (Fig. 11) and contains a wick adapted to engage the right-hand face of the disk. The purpose of this lubrication is to prevent noise due to contact of the arguto wood point 29' with the face of the disk.

The worm gear 25 (Fig. 3) consists of a sleeve surrounding a hollow shaft 32, said sleeve having teeth on its outer surface. The upper end of the hollow shaft is expanded to provide a head 33 which serves as a friction driving member for the record table 34. Any convenient means may be provided to provide for a driving engagement between the head and the record table. In the present instance we have provided a layer of cork 35 on the head and a layer of felt 36 at the under side of the table. The table is further provided with a layer of felt 37 at the upper side which cushions the records as they descend thereon whether they are in their usual form or are provided with protecting means as illustrated and described in our copending applications No. 47,099 filed July 30, 1925 and No. 50,062, filed August 13, 1925. The turntable may be mounted on the hollow shaft 32 in any convenient manner as by a flanged sleeve 36' pinned to the shaft.

The worm gear 26 is loosely mounted on a sleeve 39 (Fig. 3) secured in place in a bridge 39' of the frame 31 supporting the driving mechanism. The worm gear is formed at its upper end with clutch teeth 40 adapted to engage clutch teeth 41 on a cam 42 (Figs. 3, 7, 8, and 10) secured to a shaft section 43.

Figures 3, 22, 23:
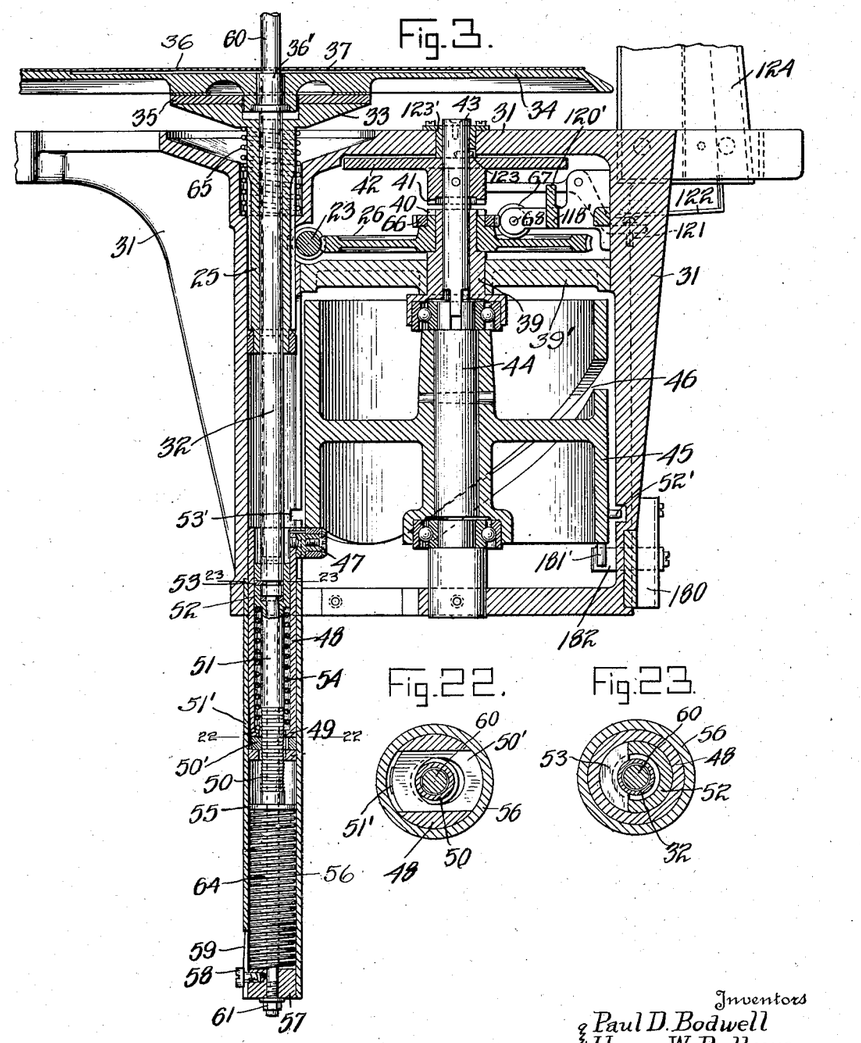

The shaft section 43 at its lower end has driving engagement with a shaft section 44 to which a cylindrical cam 45 is pinned or otherwise secured said cam having a cam groove at 46 engaging a follower 47 on a ratchet tube 48 surrounding the hollow shaft 32. The ratchet tube 48 has an annular shoulder 49 at its lower end on which rests a spring 54. A hollow ratchet post 51 is provided at its upper end with a shoulder against which the other end of the spring rests, said shoulder being at the lower end of a cup 52 integral with the ratchet post and surrounding the lower end of the spindle 32. The ratchet post is secured to the spindle 32 by a key 53 (Fig. 23). Near its lower end the ratchet post is provided with annular ratchet teeth 50 for engagement by a pawl 50' slidable transversely of the ratchet post and having teeth at the left hand side for engagement with the teeth at 50. A spring 51' (Figs. 3 and 22) tends to move the block to the right into engagement with said teeth and a pin 52' on the cam 45 reaches through a slot at 53' in the fixed frame surrounding the driving spindle to strike against the pawl 50' and move it out of engagement with said teeth, this taking place at a time when the ratchet post and the turntable shaft 32 have been lifted to their highest position. The spring 54 has for its main purpose to lift the turntable and the records thereon up against the fingers 126 hereinafter described and to move the table upward upon release of the pawl 50' by the pin 52, such movement being reduced at each addition of a record while the table is taking on records by a distance sufficient to compensate for the thickness of the additional record which has just been added to the table and bring the playing surface of the topmost record on the table to the same height with reference to the needle, which remains always at the same horizontal elevation. Another function of the spring is to lift the table with all of the records thereon during the restoring operation to the proper height for restoring the records to the position from which they may again be selected and placed one by one on the turntable, as hereinafter described.

Below the ridges 50 a flange 55 is formed on or secured to the ratchet post 51. A casing 56 surrounds the ratchet post 51 and the parts associated therewith, said casing being secured at its upper end to the frame 31. A plug 57 closes the lower end of the casing said plug being adjustably supported in the lower end of the casing by a screw 58 extending through a slot at 59 in the casing and into a threaded hole in the plug. The plug has a central aperture to receive the reduced lower end of a fixed spindle or center post 60 which extends from the plug upward through ratchet post 51, spindle 32, gear 25 and turntable 34. The center post 60 is held in place by a nut 61 at its lower end and has its end above the turntable provided with a tapered portion at 62 (Fig. 8) and an enlarged portion at 63 tapered in opposite directions, these tapered parts being for the purpose of guiding and centering the records on the turntable and to prevent binding of the records on said post. A coiled spring 64 is mounted in the casing between the flange 55 and the plug 57 said spring surrounding the center post 60 and the pressure of said spring against the flange 55 being variable by adjustment of the plug 57 up or down. The surface of the casing 56 is reduced toward the upper end of slot 59 to produce a sort of wedge. As the plug 57 is forced down by spring 64 the head of the screw 58 binds more and more firmly against said surface so as to prevent the plug from slipping out of the casing. Another spring 65 surrounds the cylindrical part of the worm gear 25, this spring seating at one end in a recess in the frame 31 and bearing at the other end against a flat annular part of head 33. This spring serves as a counterbalance for the weight of the records and their table. The upper surface of frame 31 has a shallow depression about the axis of the table adapted to receive the head 33 which may thus lie substantially flush with the tapered face of said frame.

Above the worm gear 26 is a worm gear 66 secured to the first-named worm gear to rotate therewith. Worm gear 66 has teeth meshing with the teeth of a worm 67 on a tripper shaft 68 which shaft is provided at one end with a pulley 69 (Fig. 4) connected by a belt 70 to a pulley 71 on the shaft 72 of a commutator comprising a disk 73 of insulating material having strips 74 of conducting material secured thereto at intervals about its surface and separated by slots indicated at 75. The disk is supported on the frame of the machine in any desirable manner as by means of a bracket 76 and a head 77 thereon. The rotating element of the commutator includes an arm 78 of conducting material attached to the pulley 71 and having guiding fingers 79 and 80 in which a brush 81 is supported said brush being forced toward the surface of the segments by a spring 82.

Figure 6:
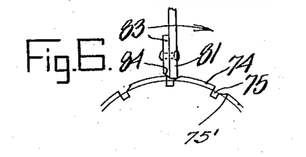

The brush rotates in a clockwise direction as viewed in Figure 6 and carries at its rear side a block of insulation 83 beveled at its lower end to provide a cam face 84. The contact strips 74 are also beveled at 75 and it will be seen that as the brush rotates its lower forward edge will ride up on the incline 75 while the lower inclined edge of the block 81 will ride down over the adjacent edge of the strip just past. The effect of this is that it is practically impossible for the brush to be out of contacting relation with one conducting strip or another as the slack of the belt 70 and the play in other parts will be sufficient to permit the inclined face of the block to exert a cam action on the pulley causing the parts to move sufficiently to permit engagement of the brush with the inclined face 75'. At the same time the relation of the edges of the brush and strips at the separating side is such that the circuit will be broken suddenly so as to prevent arcing. A leaf spring 85 within the head 77 engages the end of the shaft 72 which in turn fits closely in an opening in the arm 78 and a conductor 158 is connected to the leaf spring 85. The contacts 74 are connected by means of individual wires 86 (Fig. 21) to electric lamps 87 mounted in a series about the turntable. In the present embodiment of the invention these lamps are are mounted in openings in the mechanism board 88 provided with an aperture for the turntable, which openings are covered by globes 89 of variously colored glass. It will be understood that the lamps themselves might be colored or the lamps and globes might both be plain according to the taste of the user. A single wire 90 serves as a return conductor from all the display lamps.

Mechanism is provided in connection with the devices hereinbefore described for swinging the tone arm 91 out of engagement with the record, for replacing the last played record with another and for returning the tone arm to playing position. Such mechanism includes the cam 42 and a follower 92 in the shape of a bent rockarm, pivotally supported on a lever 93 engaging at its free end a pin 94 secured by a nut 94' to an arm 95 fixed to the tone arm said pin riding in a slot in lever 93. The lever 93 has a crescent-shaped abutment 96 attached thereto by a bolt in a manner to be pivotally adjustable about the bolt to serve as an adjustable positive stop for lever 93 said stop serving as an emergency actuating means for the tripping device, as in case the needle should jump out of the final groove in a record. The arm 92 is held yieldably in contact with cam 42 by a spring 97 and is bent downward at its free end to provide a finger engaging the periphery of the cam.

A bracket 98 (Figs. 4 and 10) secured to the fixed frame 31 supports a carriage lever 99 pivoted at 100, and said lever has a laterally projecting branch 101 (Figs. 10 and 13) with a slot at 102 adapted to receive the lower end of the pin 94 at certain times. The branch 101 is secured to the finger 99 for rotary and longitudinal adjustment by means comprising a bolt 102' extending through a slot 103 said bolt having a nut at its lower end for pressing the branch 101 and the lever 99 against the knurled faces of a hardened steel washer 104. The carriage lever rests near its free end on a guide-bar 106, this bar 106 being formed at its outer end with an upwardly-extending lug to limit the outward movement of the carriage lever 99 as clearly shown in Figs. 4, 7 and 10. At its free end the carriage lever 99 is bent downward to provide a flat end against which the carriage 107 abuts, said carriage being pivoted on a stud 108 (Fig. 12) projecting from the downwardly-bent part of carriage lever 99, thus providing for oscillatory movement of the carriage about a horizontal axis. The carriage 107 supports a pair of fingers 109 arranged at opposite sides of its pivot and is provided with a spring 110 secured at one end to the carriage and at the other end to the lever 99 for holding the carriage in an intermediate position where its threads will be in position for engagement with the threads at 112 on the tripper shaft 68.

Underneath the top member of the fixed frame 31 a lever 113 is pivoted at 114, said lever carrying at one end an adjusting screw 115 adapted to bear against the lever 93 and being actuated by a spring 116 in a direction to force the screw 115 toward said lever. An adjustable positive stop is provided at 117 for limiting the movement of the lever 113 toward the lever 93. The pressure of spring 116 holds the end of arm 92 against the cam 42, and helps to cushion the outward movement of the tone-arm. Another spring 185 hereinafter referred to acts constantly to move the tone-arm at its free end toward the axis of the record table, the purpose of said spring being to move the tone-arm so as to carry the needle from the smooth part of the record where it first engages the same, into the first groove in said record.

The cam 42 is set in action by lowering it until its teeth 41 engage the teeth 40 on the gear 26. For this purpose a pivoted trip lever 118 (Figs. 4, 7 and 10) coacts with a trip 118' (Fig. 9) pivoted at 119' and a clutch lever 119 by which the cam is normally held in elevated position. The trip has a notch in which the lever 119 rests when the clutch is disengaged. A spring 121' acts to return the trip to its normal position. A pin 122' on the trip rides in a slot in the trip lever. When the trip lever is moved upward, i. e. in a clockwise direction, at its free end by one of the fingers 109 the trip is moved in a counter-clockwise direction. Thereupon the lever 119 slips out of the notch while the weight of the cam moves it downward to bring its teeth into engagement with the teeth 40. A spring-cam 120 on the under side of cam 42 rides over the adjacent end of lever 119 while at the same time an arm 122 on a rocking device hereinafter described bears down on a set-screw 121 at the outer end of lever 119, the screw being adjustable for setting it in position to return the cam 42 to idle position, and being locked in adjusted position by a nut thereon. A relatively positive stopping means to prevent overrunning of the cam comprises a pin 123 (Figs. 3, 7 and 24) engaging a notch in a sleeve 123' at the under side of the upper cross member of the fixed frame 31, said notch having a cam shape for forcing the teeth 41 of the upper clutch member fully into engagement with the teeth 40 of the lower clutch member.

Figures 7, 8, 9, 24:
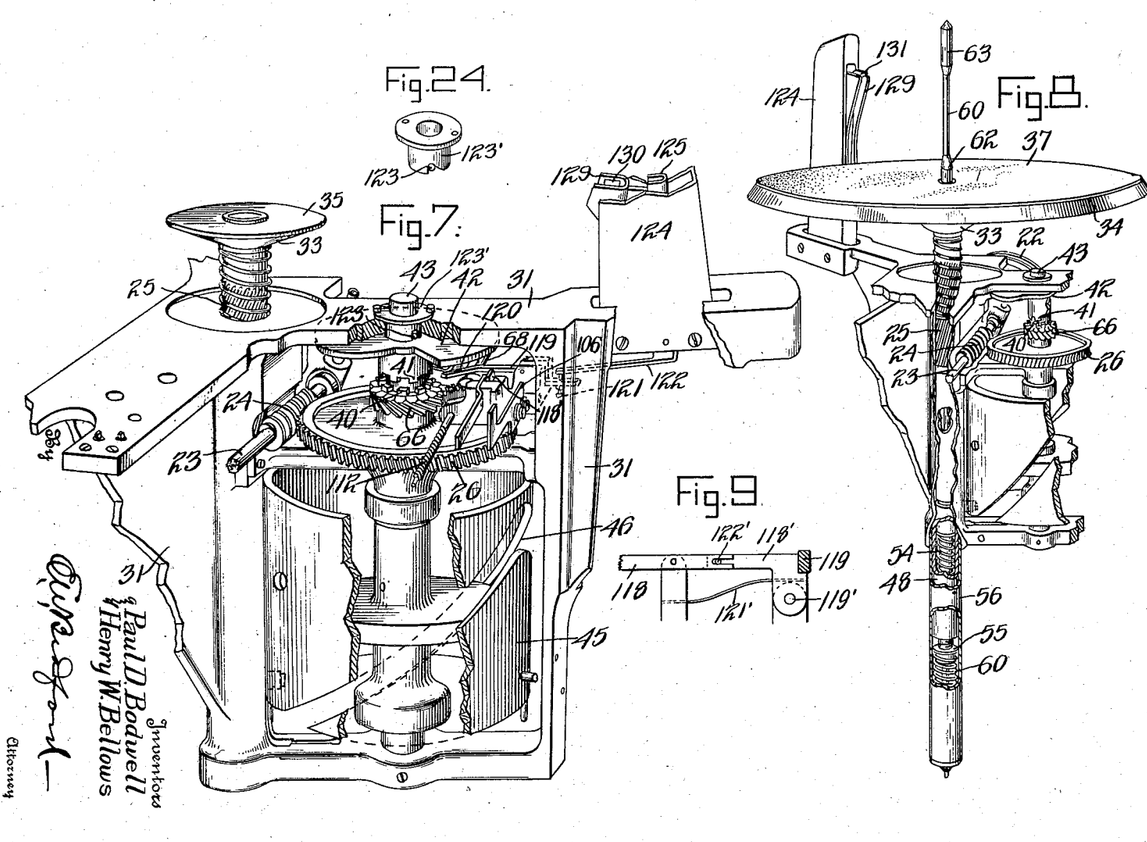

The turntable may carry one or more records, the uppermost one being in playing relation with the tone arm. As the machine is intended to utilize a plurality of records in succession it becomes necessary to provide means for supporting the remaining records of the series and such means comprises a plurality of posts 124 which are hollow and open at the inner side. Each post contains a pivoted support 125 U-shaped in section and carrying at its upper end a pointed finger 126 for separating selected records and limiting the upward movement of the turntable. A leaf spring is provided at 127 said spring acting on the flat rear end of the finger 126 to hold it normally in the position shown in Figure 14 but with freedom to move angularly to a slight extent during the record-separating action. Another support 128, also U-shaped in section, is pivotally mounted at 129 said support comprising two sides separated to a slight extent as indicated in Fig. 7.

A lever 130 (Fig. 14) is located between the sides of the U-shaped support 128 said lever being supplied at its upper end with an inwardly-directed projection 131. At its lower end the lever has a tail 132 with a lug 133 extending downward therefrom and pressed against a stop 142 by a spring 135 which limits inward movement of lever 130. A catch 136 has a hook portion extending through an opening in the support 128 for engagement with a crosspiece 136' and the catch has a lug 137 at its lower side adjacent to the upper side of the tail 132. A pin 138 limits the inward movement of the support 128. The supports 125 and 128 have upper and lower arms but for convenience their movements are referred to as "outward" and "inward", reference being had for this purpose to the upper arms only while the lower arms are ignored.

A cam lever 140 is pivoted on the support 125 between the sides thereof and is pressed upward and backward by a spring 141 coiled in a flat spiral. The cam face of the lever bears against the lower end of the lug 133 to hold the lever 130 at the most elevated position permitted by the pin and slot connection at 129. A pin 134 on post 124 limits the movement of cam lever 140 in one direction and said pin also serves to force cam 140 at times into the inoperative position illustrated in Fig. 18. A stop 142 is fixed to the support 125 and bears at its forward end against a depressed part of the outer face of the lever 130. A spring 143 is fixed at one end to the U-shaped support 125 between the sides thereof and is bent upward at its free end to engage against the rear face of the support 128. A pin 144 limits the inward movement of the upper end of support 128.

The tone-arm 91 has a downwardly extending portion passing through the plate 88 which extends at its lower end into the small end of a horn 145.

A display apparatus is provided at the rear of the mechanism such apparatus preferably consisting of a device by means of which cards 146 are interchangeably exhibited either at the front alone or at the front and rear of the device as in the present instance. These cards may bear advertising matter on either face or may be provided with pictures for the instruction of children or may be varied in other respects according to the desires of the trade. The motor 147 is connected by belt gearing indicated at 148 to an endless chain 149 behind a bracket 150. A suitable guide 151 slides on the bracket and is connected to the chain as by a pin passing through a link of the chain into the guide 151 in a manner well-known to those skilled in the art. At its inner side the guide carries a projection 152 connected to a rod 153 which by means of conventional mechanism effects the change of the cards 146. The cabinet 154 containing the cards 146 is provided with lights at top and bottom or at other convenient points, these lights being in the form of electric lamps 155 indicated in Figure 21.

Figure 21:
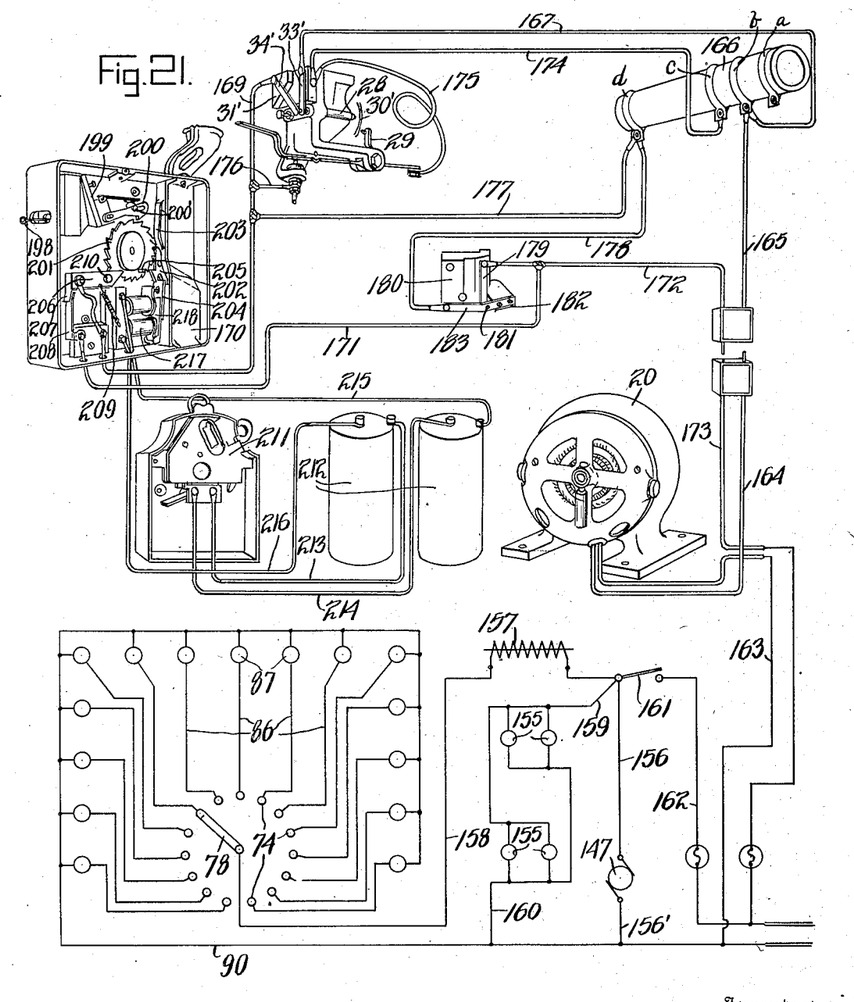

As will be evident from the wiring diagram in Figure 21 the circuit for the mechanism board lights can be traced through a conductor 156, a series transformer 157, and a conductor 158 to the commutator arm 78, and thence through conductors 86 to the various lamps 87 which are connected by a common return wire 90 to the main line. The circuit for the lights 155 may be traced through conductors 159, 160 and 90 back to the main line. The series transformer is interposed in the circuit of the record board lights to step down the current as these are six volt lamps while those at 155 are 110 volt lamps. The display motor 147 is connected in the circuit by conductors 156, 156' and 90. A single switch 161 controls the circuits through the display motor, the lights 155 and the lights 87, this switch closing the circuit through a conductor 162 connected to the main line.

Figure 1:
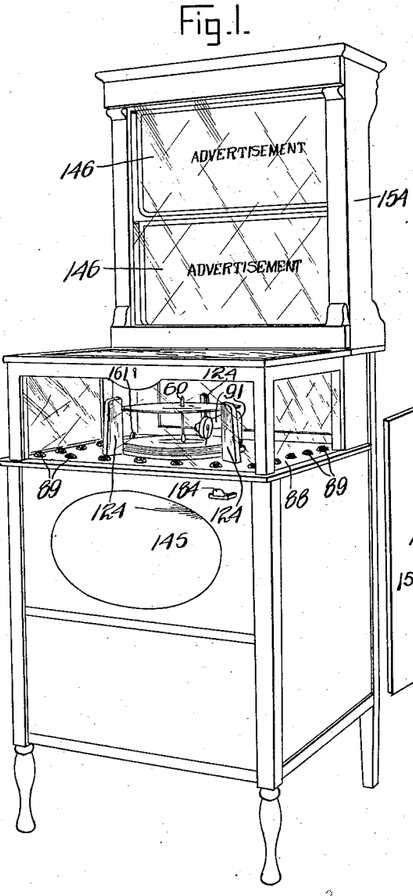

The circuits controlling the turntable may be traced as follows: Assuming the contacts 207 and 208 to be out of engagement, the contacts 33' and 34' will be in engagement because of the position of the weights on the centrifugal speed governor, the governor disk 30' being in its extreme left-hand position. The coin being inserted at 184 (Fig. 1) the circuit will now be closed through contacts 207 and 208, the specific mechanism for this purpose being hereinafter described. The circuit may now be traced through conductor 163, motor 20, conductors 164, 165 to terminal band b on the resistance coil 166, thence through conductors 167 to contacts 33' and 34', then through conductor 169 to contacts 207 and 208, and then through contacts 171, 172, 173 back to the main line. This circuit is effective for starting the motor or for driving at times when the power requirements are high as in changing records, etc.

The phonograph motor being now started the circuit will remain as above described until the parts have speeded up sufficiently to bring the governor disk 27 out of engagement with the controller 28 and into engagement with the controller lever 29. The disk remains in engagement with the point 29' on said lever and controls the playing speed within narrow limits, breaking the contact at 32' (Fig. 11) whenever the speed becomes excessive. At this time the circuit may be traced as before through conductor 163, motor 20, conductors 164, 165 to the terminal band b then through the resistance coil 166, terminal band c, then through conductors 174 and 175 and lever 29 to contact points 32', then through conductors 176 and 169 to contacts 207 and 208, then through conductors 171, 172, 173 back to the main line.

The parts will continue in this position during the playing and until the selecting takes place for bringing a new record into place on the turntable whereupon a downward projection 188 (Fig. 20) on one of the supports 125 will cause the circuit to be broken at 207, 208 in a manner hereinafter explained. When the circuit is broken at this point the current will flow through conductor 169, through conductor 177 to terminal band b on resistance coil 166, then by conductor 178 to contacts 181 and 179, thence by conductors 172 and 173 to the main line. This condition will prevail until cam 45 has revolved so far as to bring pin 181' against the insulating block 182 and cam it back against the tension of its spring 183 to break the circuit between contacts 181 and 179 whereupon the motor stops leaving the turntable in proper position to start playing the next record. The switch 161 must also be closed if the cabinet lights 155, the lights 87 on the mechanism board and the card displaying apparatus are to operate.

When the coin is inserted, assuming the switch 161 to be open, the motor 20 will start and will drive the talking machine mechanism through pulley 22. Assuming the parts to be in position ready for operation the turntable will now be rotated and the tone arm will move inward carrying with it the sound box. The tone arm actuates the rock arm 95 and the lever 93, the pin 94 traveling along the arcuate edge of member 101. As the tone arm approaches the end of its inward travel the pin 94 enters the slot 102 in arm 101 and moves the carriage 107 to bring its threads into engagement with the threads on the shaft 68. By reason of the fact that records differ, some having more grooves per inch than others, and some having playing grooves approaching closer to the center of the record disk than others, it is desirable to have the carriage engage the threads only after a considerable part of the record has been played. The reason for this is that the difficulty of synchronizing the operation of parts increases with the length of engagement. Thereupon the rotation of the shaft 68 continues to move the carriage lever 99 along its support 106 until the needle reaches the innermost groove whereupon the tone arm no longer moves inward and therefore prevents further movement of the carriage lever 99 through its connection with branch 101. The carriage 107, however, has its lower portion impelled further to the right by the engagement of its screw threads with threads 112 and is therefore tilted so as to swing one of the fingers 109 against the under side of the trip-lever 118. The trip-lever is thus swung upward at its free end and by reason of the connections illustrated in Fig. 9 it swings the trip 118' in a counter-clockwise direction whereupon the clutch lever 119 slips off the ledge at the bottom of the notch allowing the cam 42 to descend bringing the upper clutch teeth 41 into engagement with the lower teeth 40.

Some records have a concentric final or stop groove where the needle stops its inward movement whereas other records have an eccentric or quick stop final groove. In the former case the carriage is tilted in one direction by its continuing travel on account of the drive through the threads 112; in the latter case the groove causes the tone arm to move suddenly inward and therefore moves the carriage lever faster than the carriage, so that the carriage lags behind and is tilted, thus causing the other arm 109 to actuate the trip-lever and throw the record-changing mechanism into operation. Thereupon the cam 42 is caused to rotate and acts against the downwardly bent end of arm 92 thus forcing the lever 93 and the rockarm 95 outward from the positions illustrated in Fig. 10 and moving the tone arm outward with respect to the record and beyond the outer edge thereof. Such movement also moves the carriage lever 99 back to its original position at some distance away from the threads 112 of shaft 68, the carriage being dragged over such threads. The cam 42 and its clutch mechanism being fast to the shaft 43 will also rotate the shaft 44 by means of the keyway joining their ends and thus will rotate the cam 45.

Figures 14, 15, 16, 17:
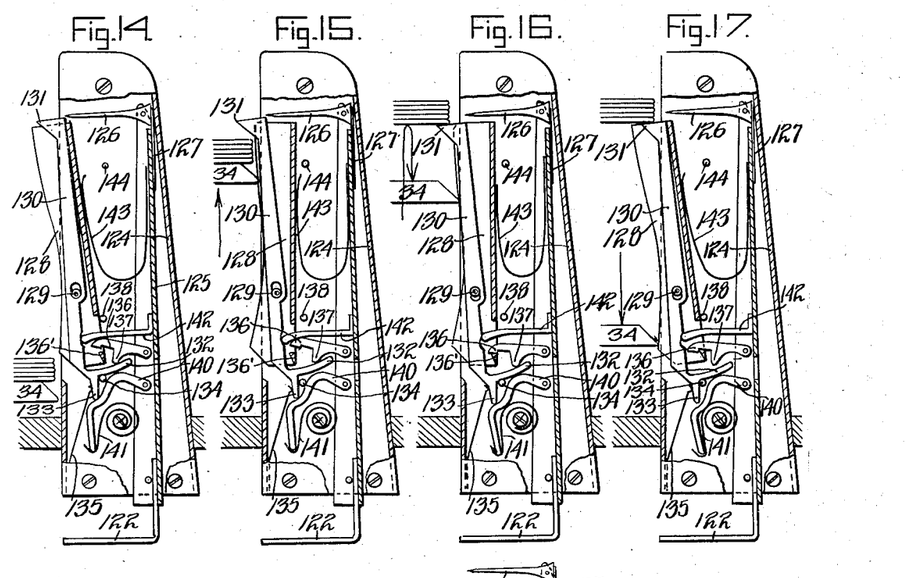

When the operation of the machine is first started or when a new set of records is placed on the machine the set is of course placed between the posts 124 on the supports 128 which will project inward at this time. Let it be assumed that the operation has proceeded so far that all the records are on the turntable as in Fig. 14 which illustrates the playing position. When the playing of the uppermost record is completed the turntable is lifted by the cam groove 46, swinging the supports 128 about their pivots 129 to move their upper ends outward (Fig. 15). When the uppermost record comes into engagement with the under cam surface of the lever 130 the lever is also swung about its pivot 129 by engagement of the edges of the records with the projections at the upper ends of said levers. After the records have passed points 131 the levers snap back under pressure of springs 135 so as to engage underneath the stack of records, as in Fig. 16, the beveled edge of the table permitting the points 131 to pass under the edges of the records. Before the table rose (i. e., while the last record was being played) the supports 128 and the levers 130 were in the positions indicated in Figure 14, the supports 128 being moved inward by the springs 143, which movement is limited by pins 138 and the levers 130 being swung inward about their pivots 129 by springs 135 until stopped by their limiting pins 134.

It will be seen on reconsideration of Figures 14 and 15 that when there are no records on the supports 128 in idle position the levers 130 will be held in their uppermost position, where they project beyond the supports 128, by means of cam levers 140 actuated by springs 151 and therefore the tails 132 of said levers 130 will hold the catches 136 out of engagement with the cross-pieces 136' on the supports 128. The swinging movement of the supports 128 therefore will not affect the supports 125 which will remain in the position indicated in Figure 14. It may be remarked at this point that we prefer to utilize with the machine such record holding and protecting devices as those shown and described in our copending applications hereinbefore mentioned and that the supports 128 and 130 will then engage with the outer and under edges of such devices rather than with the records themselves.

The record table now moves downward under the continued rotation of the cam 45 but owing to the position of the points 131 all the records remain in elevated position upon the upper ends of levers 130. The supports 128 now move inward to support the records as the table moves down and the levers 130 by reason of the weight thereon are moved into their lowermost position (as indicated in Figures 16 and 17) whereby the catches 136 engage the lugs 136' as the supports are swung inward, the tails 132 of the levers being depressed to permit such action.

The table having moved downward below the playing level the tone arm now moves inward into playing position, and the table rises, but there being no record on the table the tone arm immediately swings further inward. The catch 136 being out of engagement with support 128 at this time (Fig. 16) the support 125 will not be moved on its pivot by the inward movement of support 128 and therefore the arm 122 will not lift the clutch-lever 119 into the notch in trip 118'. The clutch of the record-changing mechanism will therefore remain in engagement so as to cause immediately another record-changing operation; i. e., the empty turntable will rise to receive the lowermost record from the stack. Inasmuch as the levers 130 are now forced downward by the weight of the records into the position indicated in Figs. 16 to 19, thereby permitting the catches 136 to engage the cross-pieces 136', the outward movement of the supports 128 at their upper ends will cause traction to be exerted on the catches 136 and through them on the supports 125 which now move the fingers 126 inward and by means of the stops 142 act on the rear faces of levers 130 to force them to swing outward with the supports 128. The movement of supports 128 and 125 toward each other compresses the springs 143, the outward movement of supports 128 being limited by pins 144.

Figures 18, 19, 20:
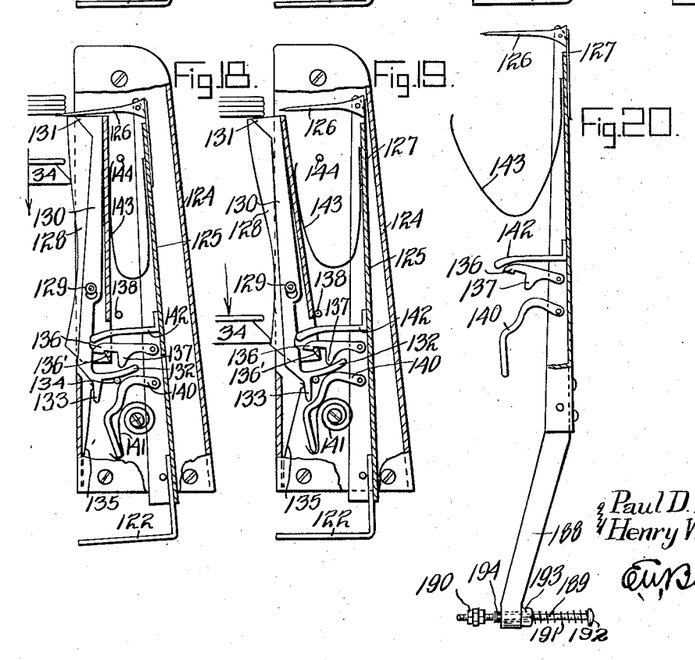

As the turntable moves upward the fingers 126 assume the position of Figure 18 whereby they enter between the lowermost record and the others in the stack, so as to support all of the records but the lowermost one and when the supports 128 are moved sufficiently far outward the lowermost record falls into playing position on the record table which table continues to rise. It will be noted that the fingers 126 rest on the upper ends of levers 130 at this time and so prevent them from rising under the pressure of spring-actuated cam levers 140. If this were not so the tails 132 might press off the catches 136, whereupon the springs 143 might force one or more of the fingers out from under the records so as to let the stack tilt or fall. The table still rises but its upward movement at this time is limited and determined by the engagement of the fingers 126 with the upper face of the record carried by the turntable. After the upward movement of the table has been stopped by the fingers 126 the ratchet tube 48 continues to be raised by the cam 45 through follower 47, the teeth on the pawl 50' slipping upward over the teeth on the ratchet tube 51 until the follower has reached its highest position.

At this time the cam 45 is revolving and the follower 47 is held against the lower edge thereof by spring 64.

When the pawl 50' is released the uppermost record on the table engages the fingers 126 and these fingers hold the table, the spindle 32 and the ratchet post 61 positively against upward movement. At this time the follower 47 is at the upward limit of its travel and is held up by its cam acting against the underside of the follower. The shoulder 49 being held in place by the follower 47, the spring 54 is pressed upward and acts through the ratchet post and the spindle 32 to lift the table. The position of the pawl 50' is also fixed by the position of the follower 47 and the ratchet post. As the upward movement of the table is limited by the fingers 126 according to the number and thickness of the records upon the table it follows that the re-engagement of the pawl 50' with the ratchet teeth will be in accordance with the number of records on the table. As the cam 45 continues to rotate the pin 52' will leave the pawl and the spring 51' will force it back into engagement with teeth 50. The table is now moved downward toward playing position by the cam 45 acting on follower 47 and it will be seen that the horizontal level of the playing surface will be a uniform one regardless of the number of records on the table, due to the varying engagement between the pawl 50' and the ratchet teeth 50.

At the time the records are restored as in Fig. 16, the fingers 126 not being in position to limit the upward movement of the table, the spring 54 can expand to its limit and might move the table to an undesirable extent but for the fact that the flange 55 on the ratchet post engages the under side of the ratchet tube to limit the upward movement of the table and the parts connected therewith. At this time the turntable is lifted to its highest position by the spring 54, the pawl 50' having been released by pin 52' from the ratchet post so that the ratchet post can move freely upward. The pawl is released at each change of records, but this produces no effect except at the time for restoring the records, as the table is held down by the fingers 126 at other times. The spring 64 serves to hold the follower 47 up against the under side of the cam 45.

The supports 128 and the levers 130 are held in outward position (Fig. 19) by the edge of the turntable and the projections 142 respectively until the table moves downward from the position there indicated whereupon the supports 128 are permitted to move inward and the supports 125 move outward withdrawing the fingers 126 and permitting the reserve disks to come to rest upon the upper ends of levers 130 and supports 128. The table now moves downward to permit the tone arm to swing into position over it and then is lifted into playing position these movements being due to the form of the lower cam edge of cam 45. The needle engages the smooth outer edge of the record beyond the grooves, and is drawn into engagement with the first groove by spring 185.

When the playing of the record is completed the table is moved down to permit the tone arm to be swung into its outermost position beyond the edge of the table. At this juncture the table can rise carrying with it the record just played. As the table rises the supports 128 are moved outward (substantially as in Figure 18) carrying with them the levers 130 because of their engagement with catches 136 which is now permitted on account of the presence of records on the supports 128. The fingers 126 come forward and separate the lowest reserve record from the remaining ones permitting it to fall upon the record already on the table as the supports 128 are withdrawn. The devices 126 now coact with the second record on the turntable to limit its uppermost position, and thus the table is held successively lower so that it is brought into correct playing position relative to the tone arm which playing position is, however, lower with each addition of a record. This action continues until all the reserve records have been brought into the position indicated in Figure 13. When the last record in the stack has been played the table rises as first explained and brings all the records into the position of Figure 16.

The rearmost support 125 has a rockarm 122 projecting inward from its lower end for depressing the clutch lever 119, as above explained. The righthand one of the front supports 125, as viewed from the front of the machine, i. e. that in the left-hand post in Fig. 4, has secured thereto a depending arm 188 carrying at its lower end a slidably-supported bolt 189 with a nut 190 for limiting its movement in one direction under the pressure of a coil spring 191 located between the head 192 of the bolt and a collar 193 forming the head of a hollow screw 194 engaging a threaded opening at the lower end of arm 188 and serving as a guide bearing for bolt 189. The bolt coacts with a rockarm 195 fixed to a rockshaft 196 journaled in upright position on the counting and circuit-controlling device 170. The shaft has a rockarm 197 extending from the rear of said device and serving to break the circuit in the device 170 (Fig. 21) and to reset the counting device so as to prepare it for the reception of another coin whereby the circuit is closed at this point to start the device. For this purpose the arm 197 has secured thereto a link 198 operating a rocker 199 pivotally supported at its upper end and having a pawl 200 pivotally attached thereto at its lower end, said pawl being guided by a pin 200' for movement into and out of engagement with a ratchet 201. A coil spring (not shown) at the rear side of the ratchet tends to move it clockwise and such movement is prevented by an escapement including a pawl 202, a spring 203 and a coin-controlled operating lever 204. The upper end of lever 204 lies in a notch in pawl 202. A pin 205 on the ratchet acts on a lever 206 to break the circuit between wires 169 and 171 by removing contact 207 from engagement with fixed contact 208. The lever is returned by a spring 209 into circuit-closing position.

Figures 4, 5:
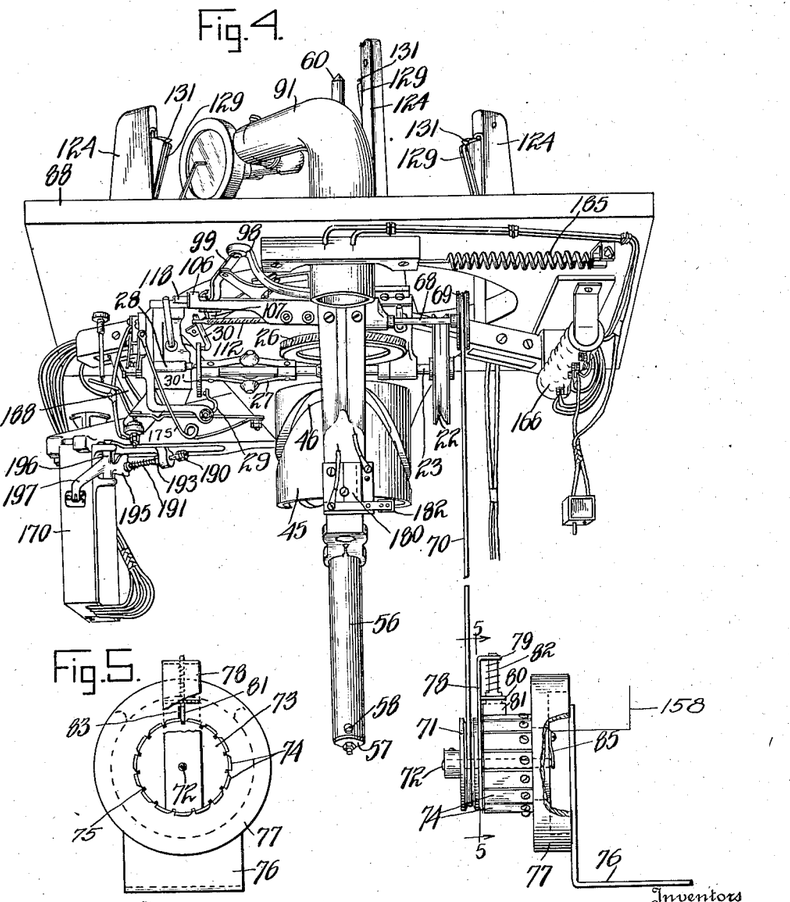

Insertion of coins operates the escapement to permit the ratchet to move one step in a clockwise direction for each coin inserted. In case only one coin is inserted the machine will play one record. When this is completed the parts move to take a new record. As the turntable rises to take on a new record, the arms 125 are moved inward swinging arm 188 (Fig. 20) outward thus causing the circuit at 207, 208 to be broken through operation of parts 195, 196, 197, 198, 199, 205, 201, 206 (Figs. 4 and 21). Thereafter the parts are driven by a circuit including parts 178, 183, 181, 179 and 172 until the cycle of the cam is completed when the circuit is broken by pin 181' striking block 182 and separating contacts 181 and 179. This circuit being broken the machine stops until after another coin has been supplied, closing the circuit at 207—208, and the cam 45 has moved far enough to remove the pin 181' from said block 182. The entire mechanism has now stopped except that the display device in cabinet 154 may continue to move, and an undetermined one of the lamps 87 remains lighted. The lighting of successive lamps 87 can only take place while the talking machine is moving but no lamps will be lighted if the switch 161 is open.

Figure 2:
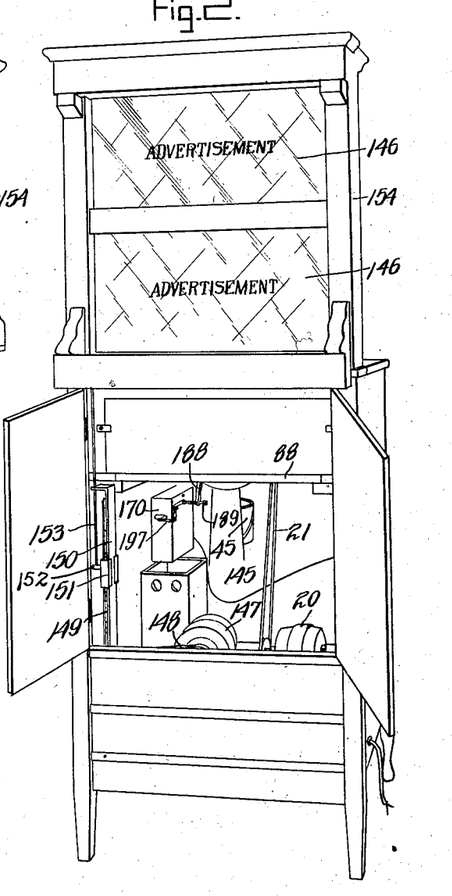

In case a number of coins have been inserted so as to permit the ratchet to move back more than one tooth, then at each exchange of records the arm 188 (Figs. 2 and 4) is caused to pawl the ratchet 201 one step in a counterclockwise direction. This has no effect on the circuit until the pin 205 strikes the end of lever 206 which is pivoted at 210. The pin tilts the lever and breaks the circuit whereupon the machine stops after having played a number of records corresponding to the number of coins deposited.

In cases where it is desired to control the operation of the machine from a distance, coin-controlled circuit-closers 211 may be located at any desirable place and connected to storage batteries 212 by conductors 213, 214, which in turn are connected by conductors 215—216 to an electromagnet 217. The armature of this magnet is mounted on lever 204, and so serves to operate the lever and the escapement whenever a coin is deposited in device 211.

It will be understood that our device may be operated without the coin control it being obviously feasible to control it by a manually operated switch. It will be seen also that the machine is not limited to repetition of the same records but records may be taken from the stack and others substituted therefor while the machine is playing without interrupting the operation. It will be obvious to those skilled in the art that various other changes may be made in our device without departing from the spirit of the invention and therefore we do not limit ourselves to what is shown in the drawings and described in the specification but only as indicated in the appended claims.

It may be noted that the machine stops only after it has played a number of records corresponding to the number of coins deposited, and then only when a record has been completed, another record has been supplied to the turntable, and the tone arm has passed off the smooth surface of the record and safely into the sound groove.

As will be understood the term "talking machine" is used herein as the conventional term to designate a music or sound reproducing apparatus.

Having thus fully described our said invention, what we claim as new and desire to secure by Letters Patent, is:

1. In a talking machine, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means operated by said cam for stopping the table at the completion of a record, coin-controlled means for setting the table in operation, said means including an auxiliary circuit, a circuit-closer therein, and means operated by the record-supplying means for breaking the circuit at this point, substantially as set forth.

2. In a talking machine, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including a clutch, and means actuated by the record-supplying means for disengaging said clutch, substantially as set forth.

3. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including a clutch, and means for operating the clutch including an element actuated by the record-supplying means, substantially as set forth.

4. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including a clutch, a clutch shipper, means for holding the clutch out of engagement, means controlled by the travel of the tone-arm for engaging the clutch, and unclutching means controlled by the record-supplying means, substantially as set forth.

5. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including power-controlled means, and means actuated by the record-supplying means for disengaging said power-controlling means, substantially as set forth.

6. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including power-controlling means, and means for operating the power-controlling means including an element actuated by the record-supplying means, substantially as set forth.

7. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means acting in timed relation with the cam for moving the tone-arm into and out of operative position including power-controlling means, means controlled by the travel of the tone-arm for applying the power, and disconnecting means for the power controlled by the record supplying means, substantially as set forth.

8. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, means operated by said cam for stopping the table at the completion of a record, coin-controlled means for setting the table in operation, said means including power-supplying means, and means actuated by the record-supplying means for disconnecting the power-supplying means, substantially as set forth.

9. In a talking machine, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, and means for moving the tone-arm away from the table at the end of a record including a rotary threaded shaft, a cooperating threaded element moved into engagement with the shaft by the tone-arm, and a trip actuated by said element, substantially as set forth.

10. In a talking machine, a tone arm, a record table, a shaft supporting the table, a cam for raising and lowering the shaft, means above the table for supporting a reserve supply of records, means for supplying the records successively to the table, means independent of the cam for supporting the table at heights varying in accordance with the number of records thereon, and means for moving the tone-arm away from the table at the end of a record including a rotary threaded shaft, a cooperating threaded element moved into engagement with the shaft by the tone-arm, and a trip actuated by said element, said element being tilted to actuate the trip by its travel after the tone-arm stops, substantially as set forth.

11. In a talking machine, a tone arm having means for exchanging disk records, means for supporting a stack of reserve records comprising a pair of supports pivoted for movement radially of such records, a catch for connecting one support to the other between their respective fulcrum points, and means controlled by the presence or absence of a record on one of said supports for determining the position of the catch, substantially as set forth.

12. In a talking machine having means for exchanging disk records, means for supporting a stack of reserve records comprising a pair of supports pivoted for movement radially of such records, a catch for connecting one support to the other between their respective fulcrum points, a lever on one support movable up and down endwise relatively to such support, a tail on the lever controlling said catch, and a spring for moving the lever upward, substantially as set forth.

13. In a talking machine having means for exchanging disk records, means for supporting a stack of reserve records comprising a pair of supports pivoted for movement radially of such records, and a lever on one support swingable with and independently of its support said lever engaging the record at the bottom of the stack, substantially as set forth.

14. In a talking machine having means for exchanging disk records, means for supporting a stack of reserve records comprising a pair of supports pivoted for movement radially of such records, a catch for connecting one support to the other between their respective fulcrum points, and means controlled by the presence of a record on one support for determining the position of the catch said means including a finger pivotally secured to one support in position to separate a record from said stack, substantially as set forth.

15. In a talking machine, means for playing a series of records in succession including a tone-arm, record-changing means, an element moving in timed relation with the tone-arm, a threaded block pivoted thereon, a rotating threaded shaft engaging said block when the travel of the tone-arm stops, and a power-controlling element for said record-changing means operable by the tilting of said block, substantially as set forth.

16. In a talking machine, means for playing a series of records in succession including a tone-arm, record-changing means, an element moving in timed relation with the tone-arm, a pivoted block thereon, means for tilting the block when the tone-arm reaches the end of its movement, a power controlling element for the record-changing means, and connections from said element to said block, substantially as set forth.

17. In a talking machine having means for exchanging disk records, a circular series of posts for holding a stack of records, a turntable, driving means therefor, and a center post extending above the turntable, said center post having parts of different diameter connected by tapered surfaces for alining the records in a stack, substantially as set forth.

18. In a talking machine having means for exchanging disk records, a circular series of posts for holding a stack of records, a turntable, driving means therefor, and a center post extending above the turntable said center post approximately fitting the opening in a record at its upper end and adjacent the turntable and being of reduced size between said parts, substantially as set forth.

19. In a record-changing talking machine, a turntable, means for lowering and raising the said table, means for supplying records successively to the turntable, a ratchet mounted for up and down movement with the table, a pawl engaging the ratchet, and means for varying the engagement of the pawl at each change in the number of records on the table to keep the playing surface at a predetermined elevation, substantially as set forth.

20. In a record-changing talking machine, a turntable, means for lowering and raising the said table, means for supplying records successively to the turntable including a cam, a ratchet mounted for up and down movement with the table, a pawl engaging the ratchet, means for varying the engagement of the pawl at each change in the number of records on the table to keep the playing surface at a predetermined elevation said means including a pin on the cam for disengaging the pawl, and a spring to return the pawl to engaging position, substantially as set forth.

21. In a record-changing talking machine, a turntable, means for lowering and raising the said table, means for supplying records successively to the turntable including a cam revolving on an axis parallel to that of the table, a ratchet mounted for up and down movement with the table, a pawl engaging the ratchet, means for varying the engagement of the pawl at each change in the number of records on the table to keep the playing surface at a predetermined elevation including an element movable in timed relation with said cam for releasing said pawl, and automatic means for returning said pawl into engagement with the ratchet, substantially as set forth.

22. In a record-changing talking machine, a turntable, means for moving the table up and down, a center post extending through the table into guiding engagement with the records thereon, a casing surrounding the lower end of the center post, a plug closing the lower end of the casing, means tending to force the plug out of the casing, and a set screw extending through a slot at the lower end of the casing into engagement with said plug the casing at opposite sides of the slot increasing in thickness toward a downward direction, substantially as set forth.

23. In a talking machine, a cylindrical casing, a plug closing one end thereof, means to force the plug out of the casing, and a setscrew engaging the plug through a slot terminating at the end of the casing the walls of said slot increasing in thickness in a downward direction, substantially as set forth.

24. In a record-changing talking machine, a turntable, a tone-arm, a rocking member movable by the tone-arm, means moving in synchronism with the turntable adapted to engage said member near the completion of a record, means for supplying a record to the turntable, means for tilting said rocking member upon a change in the movement of the tone-arm, and connections whereby rocking of said member starts said supplying means, substantially as set forth.

In witness whereof, we have hereunto set our hands at Waynesboro, Pennsylvania, this twenty-seventh day of August, A. D. nineteen hundred and twenty-five.

PAUL D. BODWELL.
HENRY W. BELLOWS.